United States Patent
Shen et al.

(10) Patent No.: US 8,964,417 B1
(45) Date of Patent: Feb. 24, 2015

(54) POWER CONTROLLERS AND CONTROL METHODS SUITABLE FOR OPERATING A SWITCHED MODE POWER SUPPLY IN QUASI-RESONANT MODE

(71) Applicant: Grenergy Opto Inc., Hsin-Chu (TW)

(72) Inventors: Yi-Lun Shen, Hsin-Chu (TW); Yu-Yun Huang, Hsin-Chu (TW)

(73) Assignee: Grenergy Opto Inc., Hsin-Chu (TW)

( * ) Notice: Subject to any disclaimer, the term of this patent is extended or adjusted under 35 U.S.C. 154(b) by 0 days.

(21) Appl. No.: 14/094,610

(22) Filed: Dec. 2, 2013

(51) Int. Cl.
  *H02M 3/335* (2006.01)
  *H02M 3/04* (2006.01)
(52) U.S. Cl.
  CPC ......................... *H02M 3/04* (2013.01)
  USPC .......................................... 363/21.02; 363/95
(58) Field of Classification Search
  USPC .............. 363/20, 21.01, 21.02, 21.03, 95, 97,
    363/131; 323/234, 282, 284, 351
  See application file for complete search history.

(56) References Cited

U.S. PATENT DOCUMENTS

| | | | | |
|---|---|---|---|---|
| 4,631,652 A | * | 12/1986 | Wendt | 363/16 |
| 4,999,568 A | * | 3/1991 | Gulczynski | 323/351 |
| 5,382,783 A | * | 1/1995 | Bremer | 235/462.27 |
| 5,404,092 A | * | 4/1995 | Gegner | 323/207 |
| 5,528,010 A | * | 6/1996 | Herwig et al. | 219/76.16 |
| 5,745,359 A | * | 4/1998 | Faulk | 363/95 |
| 5,825,638 A | * | 10/1998 | Shutts | 363/21.11 |
| 5,841,641 A | * | 11/1998 | Faulk | 363/21.14 |
| 5,959,851 A | * | 9/1999 | Shutts | 363/21.18 |
| 6,134,124 A | * | 10/2000 | Jungreis et al. | 363/34 |
| 6,356,467 B1 | * | 3/2002 | Belehradek, Jr. | 363/24 |
| 6,366,481 B1 | * | 4/2002 | Balakrishnan et al. | 363/21.15 |
| 6,373,725 B1 | * | 4/2002 | Chang et al. | 363/21.01 |
| 6,434,247 B1 | * | 8/2002 | Kates et al. | 381/312 |
| 6,462,971 B1 | * | 10/2002 | Balakrishnan et al. | 363/95 |
| 6,597,586 B2 | * | 7/2003 | Balakrishnan et al. | 363/16 |
| 6,631,064 B2 | * | 10/2003 | Schuellein et al. | 361/93.1 |
| 6,853,563 B1 | * | 2/2005 | Yang et al. | 363/21.15 |
| 6,952,355 B2 | * | 10/2005 | Riggio et al. | 363/21.15 |
| 7,848,117 B2 | * | 12/2010 | Reinberger et al. | 363/16 |
| 8,089,323 B2 | * | 1/2012 | Tarng et al. | 331/117 FE |
| 8,115,457 B2 | * | 2/2012 | Balakrishnan et al. | 320/166 |
| 8,134,848 B2 | * | 3/2012 | Whittam et al. | 363/84 |
| 8,369,111 B2 | * | 2/2013 | Balakrishnan et al. | 363/21.15 |
| 8,461,813 B2 | * | 6/2013 | Chapman | 323/259 |
| 8,749,994 B2 | * | 6/2014 | Kleinpenning | 363/19 |
| 2010/0202169 A1 | * | 8/2010 | Gaboury et al. | 363/49 |
| 2010/0202175 A1 | * | 8/2010 | Balakrishnan et al. | 363/126 |
| 2010/0308026 A1 | * | 12/2010 | Vogel | 219/130.21 |
| 2013/0106379 A1 | * | 5/2013 | Morrish | 323/282 |
| 2013/0127353 A1 | * | 5/2013 | Athalye et al. | 315/193 |
| 2014/0119078 A1 | * | 5/2014 | Walters et al. | 363/89 |

* cited by examiner

*Primary Examiner* — Adolf Berhane
(74) *Attorney, Agent, or Firm* — McClure, Qualey & Rodack, LLP

(57) ABSTRACT

The disclosure provides a power controller and related control method for a switch mode power supply operating in a quasi-resonant mode. The switched mode power supply has a power switch and an auxiliary winding. The power controller has a feedback pin connected to the auxiliary winding. A clamp circuit is connected to the feedback pin and configured for clamping a voltage at the feedback pin by providing a clamp current. A peak hold circuit is connected to the clamp circuit for generating a peak record substantially corresponding to a peak value of the clamp current. A valley detector is configured for providing an entry signal indicating a start of a voltage valley. A delay circuit provides a trigger signal a delay time after the entry signal is provided. The delay time varies in response to the peak record, and the trigger signal is capable of turning on the power switch.

20 Claims, 5 Drawing Sheets

US 8,964,417 B1

POWER CONTROLLERS AND CONTROL METHODS SUITABLE FOR OPERATING A SWITCHED MODE POWER SUPPLY IN QUASI-RESONANT MODE

BACKGROUND

The present disclosure relates generally to power controllers and control methods for switched mode power supplies, especially to power controllers suitable for operating a switched mode power supply in quasi-resonant mode.

Power converters or adapters are devices that convert electric power provided from batteries or power grid lines into power with a regulated voltage or current, such that electronic apparatuses are powered properly. For advanced apparatuses that are required to be environment-friendly, conversion efficiency of a power converter, defined as the ratio of the power that the power converter outputs to a load over the power that the power converter consumes, is always a big concern. The less the power consumed by a power converter itself, the higher the conversion efficiency. It is a trend for power supply manufactures to pursue higher and higher conversion efficiency.

Power converters operating in quasi-resonant (QR) mode are proved, in both theory and practice, to work efficiently. FIG. 1 shows a switched mode power supply 10 capable of operating in QR mode.

Bridge rectifier 20 performs full-wave rectification, converting the alternative-current (AC) power source from an AC mains outlet into a direct-current (DC) input power source $V_{IN}$. The voltage of input power source $V_{IN}$ could have an M-shaped waveform or be substantially a constant. Power controller 26 could be an integrated circuit with pins connected to peripheral devices. Via a drive pin GATE, power controller 26 periodically turns ON and OFF a power switch 34. When power switch 34 is ON, a primary winding PRM of the transformer energizes; and when it is OFF, the transformer de-energizes via a secondary winding SEC and an auxiliary winding AUX to build up an output power source $V_{OUT}$ for load 24 and an operation power source $V_{CC}$ for power controller 26, respectively.

Resisters 28 and 30 form a voltage divider to detect voltage drop $V_{AUX}$ across the auxiliary winding AUX and to provide a feedback voltage signal $V_{FB}$ at a feedback pin FB of power controller 26.

FIG. 2 demonstrates waveforms of some signals in FIG. 1. Driving signal $V_{GATE}$ at drive pin GATE drops at time $t_0$ to turn OFF the power switch 34, starting OFF time $T_{OFF}$. Signal $V_p$ at the joint P between the primary winding PRM and the power switch 34 raises sharply. Voltage drop $V_{AUX}$, which is a reflective voltage in proportion to the voltage across the primary winding PRM, becomes positive suddenly at time $t_0$. So does the feedback voltage signal $V_{FB}$, which is a divided result of the voltage drop $V_{AUX}$. The transformer starts de-energizing at time $t_0$.

After the completion of de-energizing at time $t_1$, voltage drop $V_{AUX}$ oscillates, substantially because of the resonant circuit substantially consisting of the primary winding PRM and any parasitic capacitors at the joint P. The waveform of voltage drop $V_{AUX}$ shown in FIG. 2 has three voltage valleys VL1, VL2 and VL3 where voltage drop $V_{AUX}$ is below 0V, and OFF time $T_{OFF}$ ends before valley VL3 completes. A power controller operating in QR mode operation turns on a power switch at a moment when a voltage valley occurs, and this skill is also referred to as valley switching. If the power switch 34 is turned on at the moment when voltage drop $V_{AUX}$ is at the bottom of a voltage valley, signal $V_p$ is discharged from a local minimum, enjoying less switching loss. It is not always the case, however. A well-known conventional control method for a quasi-resonant switched mode power supply is to turn on a power switch after a constant delay time $T_d$ when a voltage valley starts. Exemplified in FIG. 2, the power switch 34 is turned on after voltage valley VL3 has started for a delay time $T_d$. This constant delay time $T_d$ is generally a design choice, a constant fixed in an integrated circuit. Once the delay time $T_d$ is inappropriately chosen, the switching loss of the power switch 34 is not optimized.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified. These drawings are not necessarily drawn to scale. Likewise, the relative sizes of elements illustrated by the drawings may differ from the relative sizes depicted.

The invention can be more fully understood by the subsequent detailed description and examples with references made to the accompanying drawings, wherein.

DETAILED DESCRIPTION

Figure 3:
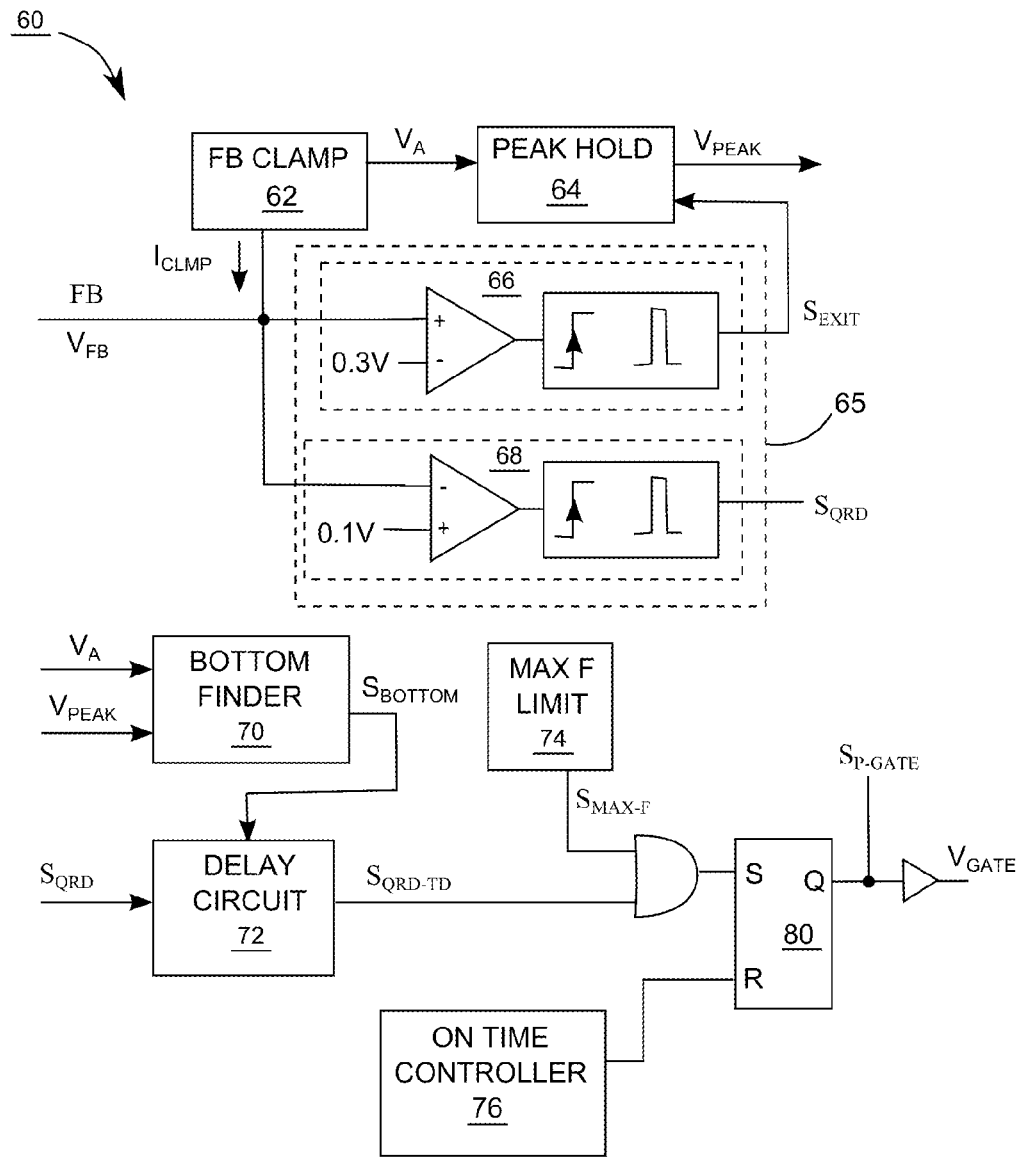
FIG. 3 exemplifies a power controller accordingly to embodiments of the invention.

FIG. 3 exemplifies a power controller 60 accordingly to embodiments of the invention. Operation of power controller 60 will be detailed in reference to the embodiments having the power controller 26 in FIG. 1 replaced by power controller 60. Power controller 60 is capable of performing valley switching at the moment when voltage drop $V_{AUX}$ is about at the bottom of a voltage valley. Accordingly, switching power loss could be substantially minimized in embodiments of the invention.

Power controller 60 has FB clamp circuit 62, peak hold circuit 64, valley detector 65, bottom finder 70, delay circuit 72, maximum frequency limiter 74, and ON time controller 76. When power controller 60 replaces the power controller 26 in FIG. 1, the feedback pin FB is connected to the auxiliary winding AUX via resistor 30.

ON time controller 76 is configured to reset SR register 80, for de-asserting the driving signal $V_{GATE}$ at drive pin GATE and starting an OFF time $T_{OFF}$. In some embodiments, the duration of an ON time $T_{ON}$, when the driving signal $V_{GATE}$ is asserted, is determined by a signal monitoring a character at an output node, the output voltage $V_{OUT}$ of FIG. 1 for example.

FB clamp circuit 62 provides a clamp current $I_{CLMP}$ to clamp the feedback voltage signal $V_{FB}$ at about 0V when voltage drop $V_{AUX}$ is negative. A sense voltage $V_A$ in proportion to the clamp current $I_{CLMP}$ is provided by FB clamp circuit 62 to peak hold circuit 64, which tracks the sense voltage $V_A$ and generates a peak record $V_{PEAK}$ corresponding to a peak value of the sense voltage $V_A$. In order to track peak values in subsequent voltage valleys, peak record $V_{PEAK}$ is slightly diminished at the time when a voltage valley ends, by way of the timing provided by an exit signal $S_{EXIT}$. It will be detailed that the deeper a voltage valley the larger the peak record $V_{PEAK}$.

Valley detector 65 has entry detector 68 and exit detector 66. In this non-limiting example, when feedback voltage signal $V_{FB}$ drops across 0.1V during OFF time $T_{OFF}$, the entry detector 68 issues a short pulse as an entry signal $S_{QRD}$ to indicate a start of a voltage valley; in the opposite, when the feedback voltage signal $V_{FB}$ raises across 0.3V during OFF time $T_{OFF}$, exit detector 66 issues a short pulse as an exit signal $S_{EXIT}$ to indicate an end of a voltage valley. 0.3V and 0.1V shown in FIG. 3 are design choices and could be replaced by other values depending on design preferences. In some other embodiments, a start of a valley could be identified at the moment when sense voltage $V_A$ just exceeds a predetermined value and an end of the valley could be identified at the moment when sense voltage $V_A$ drops across another predetermined value.

Bottom finder 70 compares the peak record $V_{PEAK}$ and the sense voltage $V_A$, to provide a bottom signal $S_{BOTTOM}$, substantially indicating the occurrence of a bottom of a voltage valley. Understandably, as the peak record $V_{PEAK}$ records about the peak value of sense voltage $V_A$ at the moment when a bottom of a voltage valley appears, if sense voltage $V_A$ of a subsequent voltage valley is in proximity to the peak record $V_{PEAK}$ it is about the moment when the bottom of the subsequent valley appears, such that the bottom signal $S_{BOTTOM}$ is asserted.

Delay circuit 72 provides a trigger signal $S_{QRD-TD}$ a delay time $T_{D-NEW}$ after the entry signal $S_{QRD}$ occurs. As shown in FIG. 3, the trigger signal $S_{QRD-TD}$ could set SR register 80, asserting driving signal $V_{GATE}$ at drive pin GATE, to turn on a power switch. The delay time $T_{D-NEW}$, dislike the constant delay time $T_D$ in the prior art, is not a constant, and could vary in response to the bottom signal $S_{BOTTOM}$. For example, the delay time $T_{D-NEW}$ could end at the moment when the bottom signal $S_{BOTTOM}$ of a voltage valley is asserted. As peak record $V_{PEAK}$ tracks the peak values of subsequent voltage valleys, the bottom signal $S_{BOTTOM}$ is asserted differently in view of timing, and the delay time $T_{D-NEW}$ varies accordingly. This delay time $T_{D-NEW}$ as will be detailed later, will be a kind of indication that a bottom of a voltage valley occurs, and a power switch is accordingly turned ON to minimize the power loss of a power switch.

Maximum frequency limiter 74 provides a block signal $S_{MAX-F}$ for preventing the trigger signal $S_{QRD-TD}$ turning on a power switch. For example, the block signal $S_{MAX-F}$ is asserted only if a switch cycle has lasted for 16 us, so as to limit the switch frequency of a switched mode power supply no more than 60 Khz.

Figure 4:
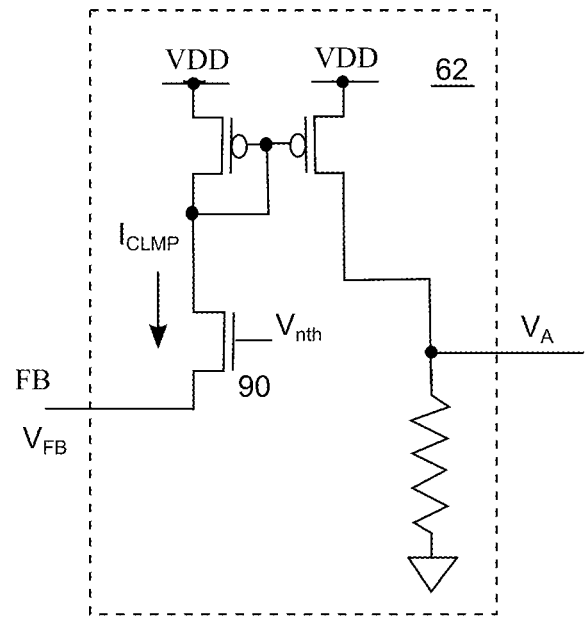
FIG. 4 exemplifies the FB clamp circuit of FIG. 3.

FIG. 4 exemplifies FB clamp circuit 62, where NMOS 90 has a gate electrode biased at voltage $V_{nth}$, a threshold voltage of NMOS 90. If the voltage drop $V_{AUX}$ is negative, NMOS 90 automatically provides clamp current $I_{CLMP}$ to substantially clamp the feedback voltage signal $V_{FB}$ at about 0V. The current mirror in FIG. 4 provides a mirror current in response to the clamp current $I_{CLMP}$ and the mirror current passes through a resistor to generate the sense voltage $V_A$.

Figure 5:
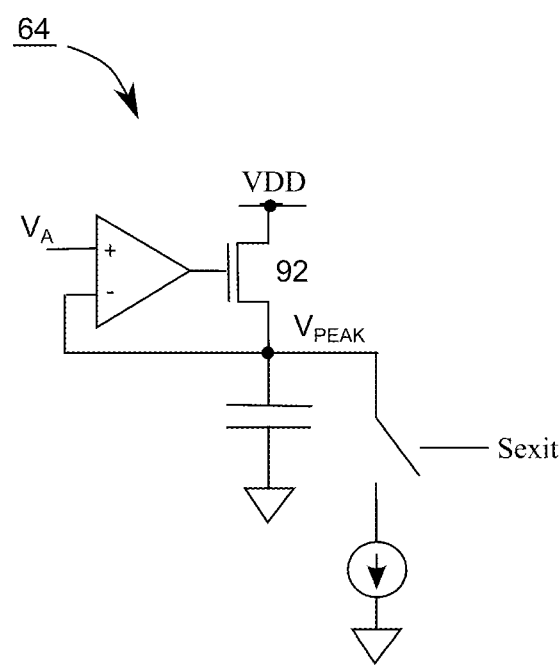
FIG. 5 exemplifies the peak hold circuit of FIG. 3.

FIG. 5 exemplifies peak hold circuit 64, where NMOS 92 charges a capacitor to increase the peak record $V_{PEAK}$ if the peak record $V_{PEAK}$ is less than the sense voltage $V_A$, so as to track the increment of the sense voltage $V_A$. The charging provided by NMOS 92 stops if the peak record $V_{PEAK}$ exceeds the sense voltage $V_A$. Accordingly, the peak record $V_{PEAK}$ represents a peak value of the sense voltage $V_A$. The deeper a voltage valley, the more negative the bottom of the voltage valley, the larger the peak current of the clamp current $I_{CLMP}$ the larger the peak record $V_{PEAK}$. The exit signal $S_{EXIT}$, which indicates an end of a voltage valley, is used to discharge the capacitor for a very short period of time, thereby lightly diminishing the peak record $V_{PEAK}$ after a voltage valley ends.

Figure 6:
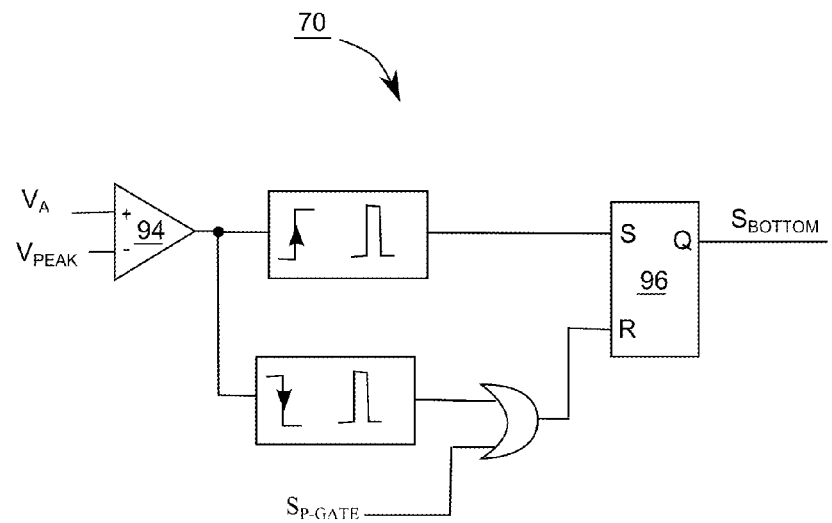
FIG. 6 exemplifies the bottom finder of FIG. 3.

FIG. 6 exemplifies the bottom finder 70 of FIG. 3. As aforementioned, the bottom signal $S_{BOTTOM}$ is asserted to indicate that the sense voltage $V_A$ is in proximity of the peak record $V_{PEAK}$. In FIG. 6, a comparator 94 compares the sense voltage $V_A$ with the peak record $V_{PEAK}$, and could have an offset voltage imbedded in one of its two inputs. If the sense voltage $V_A$ increases across the peak record $V_{PEAK}$ minus 0.1V, for example, SR register 96 is set to assert the bottom signal $S_{BOTTOM}$, declaring a start of a bottom of a voltage valley. Similarly, if the sense voltage $V_A$ drops across the peak record $V_{PEAK}$ minus 0.1V, for example, SR register 96 is reset to de-assert the bottom signal $S_{BOTTOM}$, declaring an end of a bottom of a voltage valley. In FIG. 6, signal $S_{P-GATE}$, which is equivalent to the driving signal $V_{GATE}$ as shown in FIG. 3, is used to reset the SR register 96 and to de-assert the bottom signal $S_{BOTTOM}$, because the start of an ON time $T_{ON}$ is also an end of a bottom of a voltage valley.

Figure 7:
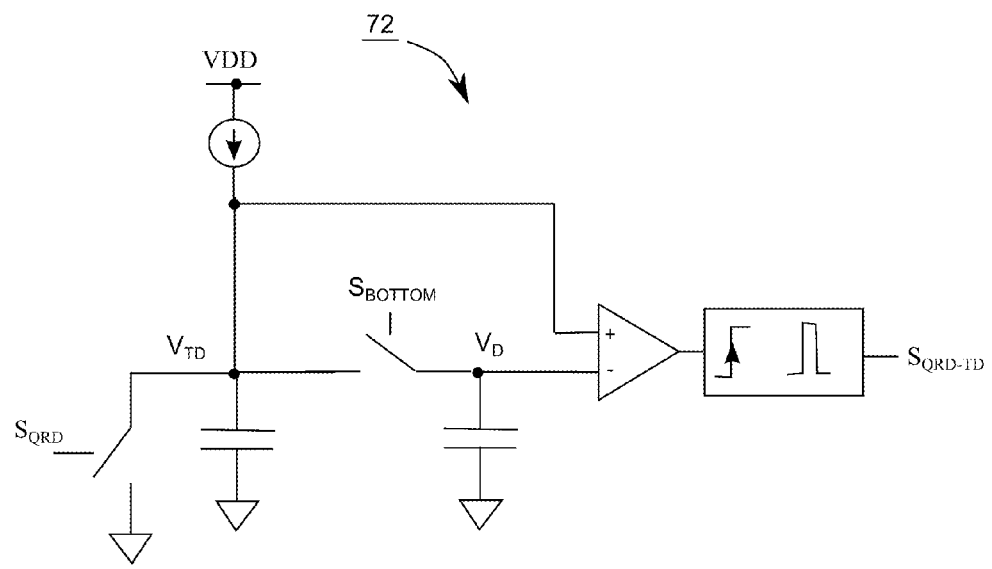
FIG. 7 exemplifies the delay circuit of FIG. 3.

FIG. 7 exemplifies the delay circuit 72 of FIG. 3. The entry signal $S_{QRD}$ resets ramp signal $V_{TD}$, making it increase from 0V. Accordingly, ramp signal $V_{TD}$ represents the time duration after the start of a voltage valley. Reference signal $V_D$ represents an optimized delay time $T_M$. The comparator in FIG. 7 could have an offset voltage in one of its two inputs. A short pulse as the trigger signal $S_{QRD-TD}$ is issued if ramp signal $V_{TD}$ exceeds the reference signal $V_D$ minus a predetermined offset voltage, for example. In other words, if the time duration after the start of a voltage valley reaches the optimized delay time $T_M$ represented by the reference signal $V_D$, the trigger signal $S_{QRD-TD}$ is asserted to have a short pulse, probably turning ON a power switch. This optimized delay time $T_M$ limits the delay time $T_{D-NEW}$ from the start of a valley to the moment that the delay circuit 72 actually issues a short pulse as the trigger signal $S_{QRD-TD}$. If the reference signal $V_D$ does not change over time, the short pulse will be faithfully issued no later than the optimized delay time $T_M$.

When the bottom signal $S_{BOTTOM}$ is asserted, the reference signal $V_D$ is updated, however, by the ramp signal $V_{TD}$. At the same time, the trigger signal $S_{QRD-TD}$ is also asserted to have a short pulse, causing a delay time $T_{D-NEW}$ shorter than the optimized delay time $T_M$. The reference signal $V_D$ eventually records the value of the ramp signal $V_{TD}$ at the moment when the bottom signal $S_{BOTTOM}$ is de-asserted, or when a bottom of a voltage valley ends.

Figure 1:
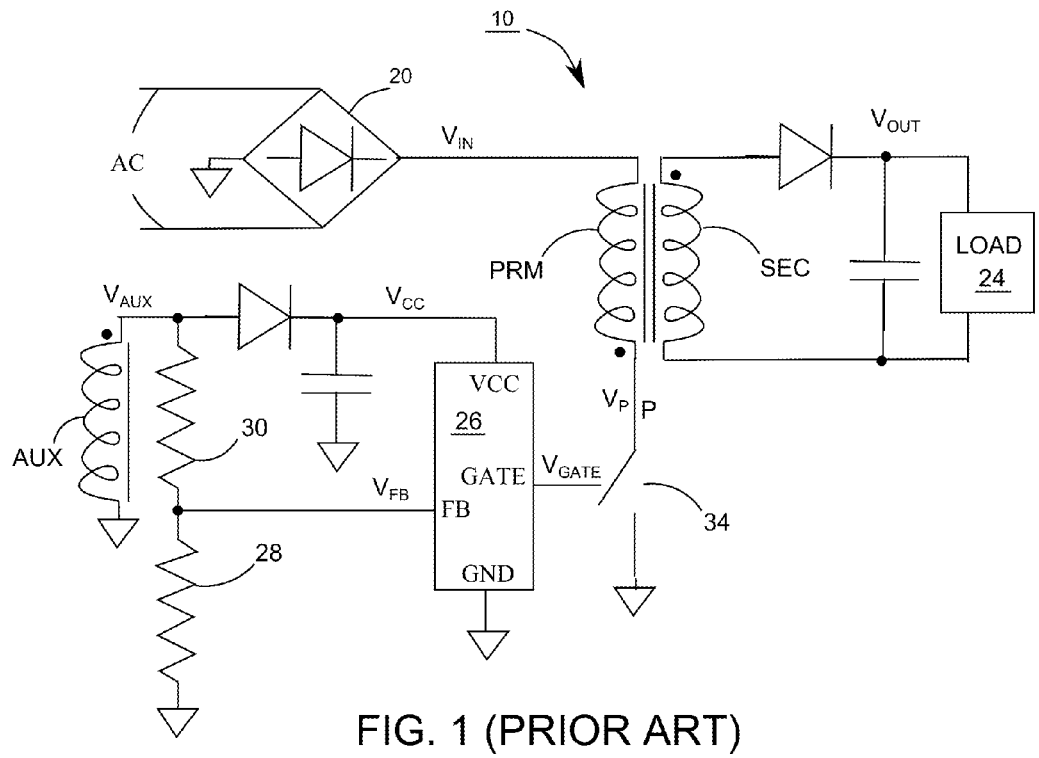
FIG. 1 shows a switched mode power supply capable of operating in QR mode.
Figure 2:
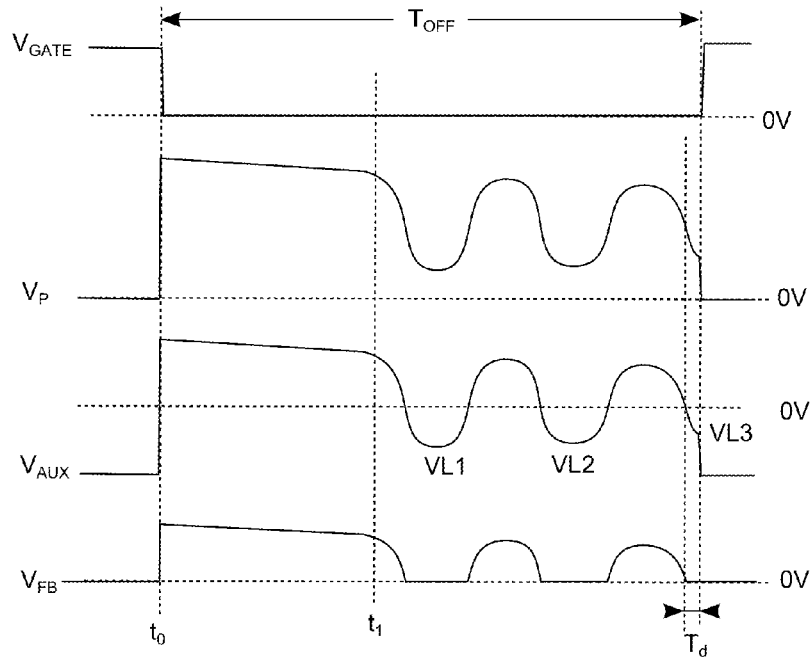
FIG. 2 demonstrates waveforms of some signals in FIG. 1.
Figure 8:
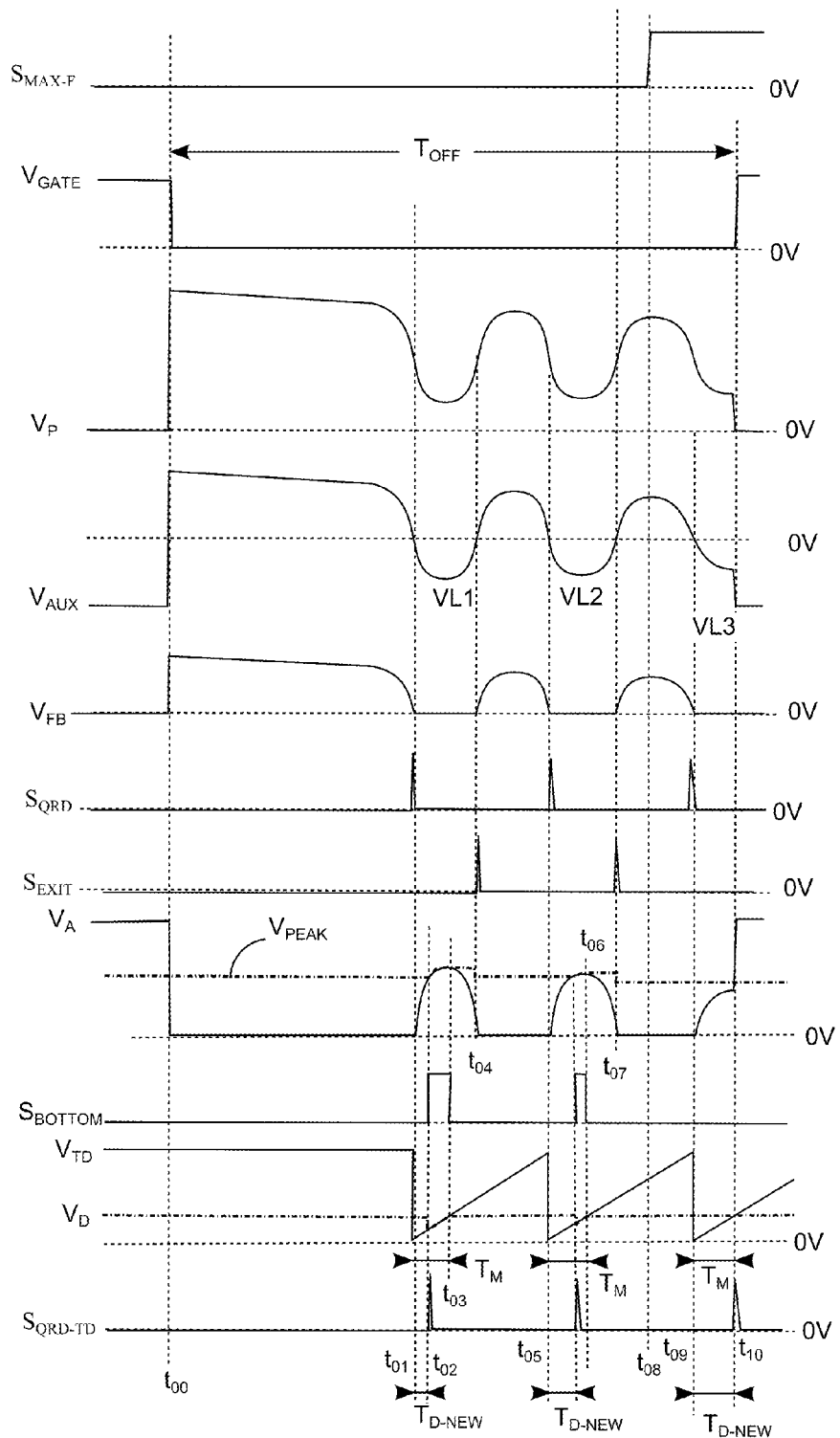
FIG. 8 demonstrates waveforms of some signals in FIGS. 1 and 3 when the power controller of FIG. 3 replaces the power controller of FIG. 1.

FIG. 8 demonstrates waveforms of some signals in FIGS. 1 and 3 when the power controller 60 of FIG. 3 replaces the power controller 26 of FIG. 1.

At time $t_{00}$, the driving signal $V_{GATE}$ is de-asserted, and the signal $V_p$, the voltage drop $V_{AUX}$ and the feedback voltage signal $V_{FB}$ all rise sharply, starting an OFF time $T_{OFF}$.

After the completion of discharge of the transformer, the signal $V_p$ and the voltage drop $V_{AUX}$ start to oscillate. At times $t_{01}$, $t_{05}$, and $t_{09}$, when the voltage drop $V_{AUX}$ drops almost to be negative, the entry signal $S_{QRD}$ has short pulses to indicate the starts of voltage valleys VL1, VL2, and VL3, respectively. Similarly, at times $t_{04}$, and $t_{07}$, when the voltage drop $V_{AUX}$ raises to be about positive, the exit signal $S_{EXIT}$ has short pulses to indicate the ends of voltage valleys VL1 and VL2, respectively.

Shown in FIG. 8, the peak record $V_{PEAK}$ tracks the sense voltage $V_A$ during the time period from $t_{02}$ to $t_{03}$, for example, but holds if the sense voltage $V_A$ decreases from its peak value. The peak record $V_{PEAK}$ is slightly diminished at the ends of voltage valleys VL1 and VL2, triggered by the exit signal $S_{EXIT}$.

The bottom signal $S_{BOTTOM}$ is asserted from time $t_{02}$ to $t_{03}$, for example, as the sense voltage $V_A$ is about in proximity to the peak record $V_{PEAK}$.

The ramp signal $V_{TD}$ starts ramping up at times $t_{01}$. At time $t_{02}$, the bottom signal $S_{BOTTOM}$ is asserted, and the reference signal $V_D$ is updated by the ramp signal $V_{TD}$, until the bottom signal $S_{BOTTOM}$ is de-asserted at time $t_{03}$. At time $t_{02}$ when the reference signal $V_D$ is the first time updated to be the same with the ramp signal $V_{TD}$, the trigger signal $S_{QRD-TD}$ is asserted to have a short pulse, as shown in FIG. 8. The driving signal $V_{GATE}$ stays de-asserted at time $t_{02}$, nevertheless, because the block signal $S_{MAX-F}$ is de-asserted currently. Accordingly, the delay time $T_{D-NEW}$ for voltage valley VL1 is the duration from $t_0$ to $t_{02}$, substantially determined by the bottom signal $S_{BOTTOM}$, which is in response to the peak record $V_{PEAK}$. The duration from the start of a voltage valley to the moment when the bottom signal $S_{BOTTOM}$ is de-asserted, such as the duration from time $t_{01}$ to $t_{03}$, is referred to as an optimized delay time $T_M$, which is memorized by and corresponds to reference signal $V_D$.

The operation described in the previous paragraph is also applicable to the operation for voltage valley VL2 from time $t_{05}$ to $t_{07}$.

The duration when the bottom signal $S_{BOTTOM}$ is asserted in a voltage valley becomes shorter in subsequent voltage valleys, as shown by the waveform of the bottom signal $S_{BOTTOM}$, because the peak value of sense voltage $V_A$ decreases over time and the slightly-diminished peak record $V_{PEAK}$ cannot track the decrement timely. Shown in FIG. 8, for voltage valley VL3 starting from $t_{09}$, the duration when the bottom signal $S_{BOTTOM}$ is asserted disappears completely, because the peak record $V_{PEAK}$ is always higher than the sense voltage $V_A$. The trigger signal $S_{QRD-TD}$ is asserted at time $t_{10}$, nevertheless, as the ramp signal $V_{TD}$ goes across the reference signal $V_D$, which was updated to memorize the optimized delay time $T_M$. Please note that the optimized delay time $T_M$ is about a quarter of a constant oscillation cycle time of the resonant circuit substantially consisting of the primary winding PRM and parasitic capacitors, and this optimized delay time $T_M$ should be a constant suitable for every voltage valley. That is the reason why the optimized delay time $T_M$ is about the same for each voltage valley shown in FIG. 8. If the trigger signal $S_{QRD-TD}$ is asserted substantially at the moment the optimized delay time $T_M$ after the start of a voltage valley, QR mode operation performs almost perfectly, with minimized switching loss. It is just the case shown in FIG. 8, where the delay time $T_{D-NEW}$ for the voltage valley VL3 is exactly the same as the optimized delay time $T_M$. The trigger signal $S_{QRD-TD}$ is asserted at time $t_{10}$, when the block signal $S_{MAX-F}$ has been asserted at time $T_{08}$, such that the driving signal $V_{GATE}$ is asserted to turn on a power switch at time $t_{10}$.

As the block signal $S_{MAX-E}$ is asserted after the second short pulse of the trigger signal $S_{QRD-TD}$ appears, FIG. 8 demonstrates an operation of valley switching in the $3^{rd}$ voltage valley VL3. It is possible that the block signal $S_{MAX-E}$ is asserted earlier to perform valley switching in the $1^{st}$ or $2^{nd}$ voltage valley (VL1 and VL2). If block signal $S_{MAX-E}$ in FIG. 8 is asserted earlier at time $t_{01}$, for example, it can be derived that the peak record $V_{PEAK}$ after several switch cycles, mainly due to signal propagation delay of the block signal $S_{MAX-F}$, will become very close to the first peak value of the sense voltage $V_A$ eventually. The delay time $T_{D-NEW}$, as peak record $V_{PEAK}$ is almost the same as the first peak value of the sense voltage $V_A$, will be substantially the same as the optimized delay time $T_M$, almost performing perfect valley switching with minimized switch loss.

Dislike the constant delay time $T_D$ in the prior art, the delay time $T_{D-NEW}$ adaptively varies in response to the bottom signal $S_{BOTTOM}$, which is adjusted in response to the peak record $V_{PEAK}$. Based on the aforementioned teaching and analysis, the moment when a bottom of a voltage valley occurs can be memorized such that a power controller according to embodiments of the invention could perform valley switching in an optimized way to reduce the switch loss of a power switch.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A power controller suitable for a switched mode power supply comprising a power switch, the power controller comprising:
   a feedback pin connected to an auxiliary winding of a transformer;
   a clamp circuit connected to the feedback pin and configured for clamping a voltage at the feedback pin by providing a clamp current;
   a peak hold circuit connected to the clamp circuit for generating a peak record substantially corresponding to a peak value of the clamp current;
   a valley detector connected to the feedback pin and configured for providing an entry signal indicating a start of a voltage valley; and
   a delay circuit configured for providing a trigger signal a delay time after the entry signal is provided, wherein the delay time varies in response to the peak record, and the trigger signal is capable of turning on the power switch.

2. The power controller as claimed in claim 1, wherein the clamp circuit provides a sense voltage in response to the clamp current, and the peak hold circuit tracks a peak value of the sense voltage to provide the peak record.

3. The power controller as claimed in claim 2, further comprising a bottom finder configured for comparing the sense voltage and the peak record to providing a bottom signal, the bottom signal substantially indicating the occurrence of a bottom of the voltage valley.

4. The power controller as claimed in claim 3, wherein the delay time ends in response to the bottom signal.

5. The power controller as claimed in claim 4, wherein the delay circuit compares a ramp signal with a reference signal to determine the delay time, and the reference signal updates when the bottom signal is asserted.

6. The power controller as claimed in claim 5, wherein the ramp signal is reset when the entry signal is asserted.

7. The power controller as claimed in claim 1, wherein the valley detector is also configured for providing an exit signal indicating an end of the voltage valley.

8. The power controller as claimed in claim 7, wherein the peak hold circuit diminishes the peak record when the valley exit signal is asserted.

9. The power controller as claimed in claim 1, further comprising:
   a maximum frequency limiter configured for providing a block signal for preventing the trigger signal turning on the power switch, thereby limiting the switch frequency of the switched mode power supply.

10. A power controller suitable for a switched mode power supply comprising a power switch, the power controller comprising:
- a feedback pin connected to an auxiliary winding of a transformer, wherein a waveform of a voltage drop across the auxiliary winding is capable of providing a voltage valley;
- a clamp circuit connected to the feedback pin and configured for clamping a voltage at the feedback pin by providing a clamp current;
- a bottom finder configured for providing a bottom signal in response to the clamp current, the bottom signal substantially indicating the occurrence of a bottom of the voltage valley;
- a valley detector connected to the feedback pin and configured for providing an entry signal indicating a start of the voltage valley; and
- a delay circuit configured for providing a reference signal corresponding to an optimized delay time from the start of the voltage valley to the moment when the bottom of the voltage valley ends, and for providing a trigger signal a delay time after the entry signal occurs, wherein the delay time is no more than the optimized delay time, and the trigger signal is capable of turning on the power switch.

11. The power controller as claimed in claim 10, further comprising:
- a peak hold circuit connected to the clamp circuit for generating a peak record substantially corresponding to a peak value of the clamp current;
- wherein the bottom signal is provided in response to the clamp current.

12. The power controller as claimed in claim 11, wherein the clamp circuit provides a sense voltage in response to the clamp current, and the peak hold circuit tracks a peak value of the sense voltage to provide the peak record.

13. The power controller as claimed in claim 12, wherein the bottom finder provides the bottom signal by comparing the peak record and the sense voltage.

14. The power controller as claimed in claim 10, wherein the delay circuit compares a ramp signal with the reference signal to determine the delay time.

15. The power controller as claimed in claim 14, wherein the delay circuit uses the ramp signal to update the reference signal during the occurrence of the bottom of the voltage valley.

16. The power controller as claimed in claim 10, wherein the valley detector is also configured for providing an exit signal indicating an end of the voltage valley.

17. A control method for a switched mode power supply having a transformer and a power switch, the control method comprising:
- clamping a voltage at a feedback pin by providing a clamp current, wherein the feedback pin is connected to an auxiliary winding via a resistor, and a voltage drop across the auxiliary winding is capable of providing a voltage valley;
- generating a peak record substantially corresponding to a peak value of the clamp current;
- providing an entry signal indicating a start of the voltage valley;
- providing a bottom signal in response to the peak record to substantially indicate the occurrence of a bottom of the voltage valley; and
- providing a reference signal corresponding to an optimized delay time from the start of the voltage valley to the moment when the bottom of the voltage valley ends; and
- providing a trigger signal when the bottom signal is asserted to indicate a start of the bottom, wherein the trigger signal is capable of turning on the power switch;
- wherein a delay time from the start of the voltage valley to the moment when the trigger signal is provided is no longer than the optimized delay time.

18. The control method as claimed in claim 17, further comprising:
- providing a ramp signal in response to the entry signal; and
- using the ramp signal to update the reference signal during the occurrence of the bottom.

19. The control method as claimed in claim 18, comprising:
- providing a sense voltage in response to the clamp current;
- tracking the sense voltage to provide the peak record; and
- comparing the sense voltage with the peak record to generate the bottom signal.

20. The control method as claimed in claim 18, comprising:
- providing an exit signal indicating an end of the voltage valley; and
- diminishing the peak record in response to the exit signal.

* * * * *